(12) United States Patent
De Vita et al.

(10) Patent No.: US 8,303,887 B2
(45) Date of Patent: Nov. 6, 2012

(54) APPARATUS FOR THE INFUSION OF RESIN INTO A PREFORM IN A CLOSED MOULD

(75) Inventors: Vincenzo De Vita, Andria (IT); Francesco Beneventi, Foggia (IT); Marco Raffone, Napoli (IT)

(73) Assignee: Alenia Aeronautica S.p.A., Pamigliano d'Arco, Naples (IT)

( * ) Notice: Subject to any disclaimer, the term of this patent is extended or adjusted under 35 U.S.C. 154(b) by 274 days.

(21) Appl. No.: 12/739,630

(22) PCT Filed: Oct. 29, 2008

(86) PCT No.: PCT/IB2008/054486
§ 371 (c)(1),
(2), (4) Date: Apr. 23, 2010

(87) PCT Pub. No.: WO2009/060347
PCT Pub. Date: May 14, 2009

(65) Prior Publication Data
US 2010/0283180 A1 Nov. 11, 2010

(30) Foreign Application Priority Data
Nov. 8, 2007 (IT) .............................. TO2007A0796

(51) Int. Cl.
*B29C 70/44* (2006.01)

(52) U.S. Cl. ........ 264/546; 264/257; 264/258; 264/454; 264/510; 264/544; 425/129.1; 425/342.1; 425/389; 425/390; 425/546

(58) Field of Classification Search ............... 425/129.1, 425/342.1, 389, 390, 546; 264/258, 257, 264/454, 510, 544, 546
See application file for complete search history.

(56) References Cited

U.S. PATENT DOCUMENTS

| | | | | |
|---|---|---|---|---|
| 2,392,108 A | * | 1/1946 | Vidal et al. | 425/389 |
| 2,899,706 A | * | 8/1959 | Caviness | 425/215 |
| 4,560,523 A | * | 12/1985 | Plumley et al. | 425/129.1 |
| 5,152,949 A | * | 10/1992 | Leoni et al. | 425/389 |
| 5,441,692 A | * | 8/1995 | Taricco | 425/129.1 |
| 6,257,858 B1 | * | 7/2001 | Pabsch et al. | 425/129.1 |

FOREIGN PATENT DOCUMENTS
DE 196 30 840 C1 2/1998
EP 1 584 462 A2 10/2005

OTHER PUBLICATIONS

English machine translation of DE 19630840, retrieved from EPO database May 1, 2012.*

* cited by examiner

*Primary Examiner* — Joseph Del Sole
*Assistant Examiner* — Timothy Kennedy
(74) *Attorney, Agent, or Firm* — Merchant & Gould P.C.

(57) ABSTRACT

A tool for the infusion of a resin into a preform made of fiber material includes a mould which can be closed around the preform and in the body of which at least one inlet duct is formed to allow resin to be injected into the mould so that the resin can be infused into the preform. At least one reservoir which can contain the resin, is also formed in the body of the mould and is connected to the at least one inlet duct. The mould can be inserted in an autoclave and the reservoir is configured to permit the transfer of the resin from the reservoir to the inlet duct under the effect of the temperature and of the pressure that are produced in the autoclave, thus allowing the resin to be injected into the mould.

6 Claims, 4 Drawing Sheets

APPARATUS FOR THE INFUSION OF RESIN INTO A PREFORM IN A CLOSED MOULD

This application is a National Stage Application of PCT/IB2008/054486, filed 29 Oct. 2008, which claims benefit of Serial No. TO2007A000796, filed 8 Nov. 2007 in Italy and which applications are incorporated herein by reference. To the extent appropriate, a claim of priority is made to each of the above disclosed applications.

BACKGROUND OF THE INVENTION

The present invention relates to a tool for the infusion of a resin into a preform made of fibre material, the tool comprising a mould which can be closed around the preform and in the body of which at least one inlet duct is formed to allow resin to be injected into the mould so the resin can be infused into the preform.

The need to reduce weight and to eliminate problems of corrosion of aeronautical structures has led the industry to construct commercial aircraft fuselages from composite material.

Amongst the structural elements which make up the fuselage, there are some which, in the current state of the art, are made of light alloy. The use of such metal elements in contact with the composite structure leads to galvanic coupling problems with risks of metal corrosion and necessitates increased inspection levels, along with the related costs to the airlines.

A need has therefore arisen to make those components that are typically designed and constructed of metal also of composite material, overcoming some material and process problems such as:
highly accurate control of the surfaces for interfacing with other fuselage parts,
fibre orientation, which is often polar and not Cartesian,
fire resistance requirements with limited release of smoke and other toxic elements.

Currently, the technology would enable such components to be made of pre-impregnated materials but that does not allow for curved orientation of the fibres; or else, it would permit the use of the "resin transfer moulding" (RTM) process which enables dry carbon fibre reinforcing preforms positioned in the curing mould to be infused with resin. This would permit both accurate control of the surfaces and the use of reinforcements with curved fibre orientations.

However, this process has the following structural disadvantage: to permit the flow of resin during the RTM process it is necessary to use highly fluid resins which cannot therefore contain within them the toughening elements that are necessary to improve properties such as compression after impact or low inflammability properties. An alternative is to use resins the toughener of which is woven into the preform and can then be dissolved in the resin upon infusion. However, that process makes the production of the preform more complex and expensive.

SUMMARY OF THE INVENTION

The object of the present invention is therefore to make available a tool which, on the one hand, permits control of the surfaces of the component to be produced and, on the other hand, also permits the infusion of resins containing tougheining agents.

This object is achieved, according to the invention, by a tool for the infusion of a resin into a preform of fibre material of the type defined above, in which at least one reservoir, which can contain the resin, is also formed in the body of the mould and is connected to the at least one inlet duct, wherein the mould can be inserted in an autoclave and the at least one reservoir is configured to permit the transfer of the resin from the at least one reservoir to the at least one inlet duct under the effect of the temperature and of the pressure that are produced in the autoclave, thus allowing the resin to be injected into the mould.

To overcome the problems of the prior art, the present invention is thus based on a closed mould for the infusion of a dry preform with resin which is also toughened and preferably in film form, and which is placed in suitable reservoirs (for example, spaces or chambers) formed in the mould. In particular, the resin may be placed in the reservoirs during the preparation of a vacuum bag. During the step of heating and pressurization in an autoclave, the resin is injected into the mould, infiltrating into the preform and consolidating the component during polymerization.

The advantages of the invention are thus:
the use of a closed mould for control of the coupling surfaces;
the use of a Resin Film Infusion" process in order to be able also to infuse toughened resin with good structural performance and with properties suitable for the FST (flame, smoke, toxicity) standards;
the possible use of dry preforms with polar/curved orientations, for example, such as those produced by "dry tow placement" (that is, those produced from a fibre tow by a stitching process with highly automated machinery) which enable the arrangement and orientation of the fibres to be optimized; this process is described in the Applicant's European patent No. EP-A-1 584 462 entitled "A method for the manufacture of a dry reinforcing preform for a composite structural member of an aircraft".

A further subject of the invention is a method for the manufacture of a structural element made from composite material, comprising the following steps:
preparing at least one preform made of fibre material,
providing a mould in the body of which at least one inlet duct is formed to allow resin to be injected into the mould,
enclosing the at least one preform in the mould, and
subjecting the mould to heating and pressure and injecting resin through the at least one inlet duct so as to bring about the infusion of the resin into the at least one preform and its subsequent polymerization,
characterized in that, prior to the heating and pressure step, the resin is placed in a reservoir that is formed in the body of the mould and is connected to the at least one inlet duct, wherein the reservoir is configured to permit the transfer of the resin from the reservoir to the at least one inlet duct under the effect of the heating and of the pressure.

Preferred embodiments of the invention are defined in the dependent claims.

BRIEF DESCRIPTION OF THE DRAWINGS

A preferred but non-limiting embodiment of the invention will now be described with reference to the appended drawings, in which.

DETAILED DESCRIPTION OF THE PREFERRED EMBODIMENTS

Figure 1:
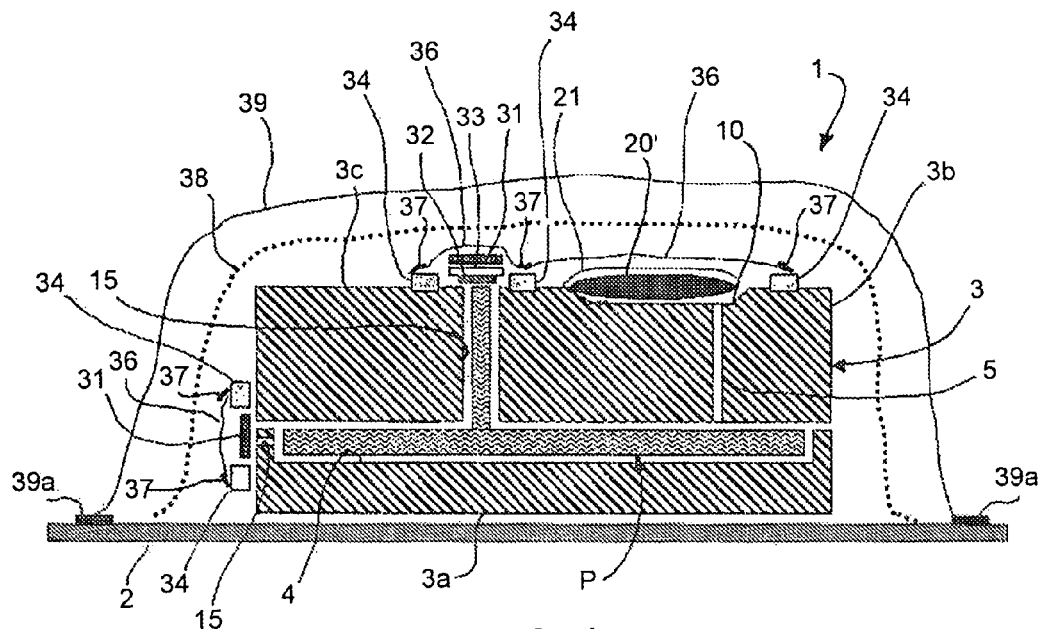
FIG. 1 is a concept diagram which illustrates the principle underlying the present invention.

FIG. 1 is a concept diagram illustrating the principle underlying the present invention. It shows, in section, a tool 1 for the manufacture of an element made of composite material and having, for example, a T-shaped cross-section. The tool shown in FIG. 1 comprises a platform 2 and a mould 3 which is positioned on the platform 2. The mould 3 comprises a plurality of portions 3a, 3b, 3c which are closed around a preform P of fibre material having the desired T-sectioned shape. In particular, in the embodiment shown, the mould 3 comprises a female portion 3a, in which a recess 4 is formed for housing a head portion of the T-section of the preform P, and two cover portions 3b and 3c which can be positioned on the female portion 3a in a coordinated manner so as to enclose a leg portion of the T-section of the preform P laterally. Conventional means (not shown) are provided for the positioning and mutual attachment of the various portions of the mould.

At least one inlet duct 5, and preferably several inlet ducts 5, are formed in the body of the mould 3; one duct is visible in the cross-section of FIG. 1. When the portions 3a, 3b and 3c are joined together so as to close the mould 3, the inlet ducts 5 connect the recess 4 to at least one reservoir 10 suitable for containing a resin for the infusion of the preform P. In the example shown, the reservoir 10 is constructed as a space or chamber formed in an exposed surface of the mould 3, in particular, the upper surface of one of the cover portions 3b, 3c of the mould 3. The inlet ducts 5 thus allow resin to be injected into the mould so that the resin can be infused into the preform P.

At least one outlet duct 15, and preferably several outlet ducts 15, are formed in the body of the mould 3 (the number and positions of the inlet and outlet ducts depends on the geometry of the part); one outlet duct 15 is visible in the cross-section of FIG. 1. When the portions 3a, 3b and 3c are joined together so as to close the mould 3, the outlet ducts 15 connect the recess 4 to the exterior of the mould 3. In the example shown, an outlet duct 15 is formed in the female portion 3a of the mould 3 and another outlet duct 15 is formed naturally by the space between the cover portions 3b and 3c of the mould 3 in which the leg portion of the T-section of the preform P is enclosed. The outlet ducts 15 thus allow the excess resin to be discharged in the manner described below.

The process of the infusion of the resin into the preform P provides for a heating and pressurization step in which the tool 1 is inserted in an autoclave (not shown).

Prior to this step, the tool 1 is equipped with a vacuum bag. A film 20 of resin, in particular toughened resin, is placed in the reservoir 10, wrapped in a separator layer 21, for example, of fluorinated ethylene propylene (FEP), the mouth of which is connected in a leaktight manner to the mouth of the duct 5.

A layer 31 (a bleeder layer) of material, for example, glass fibre suitable for absorbing the excess resin is arranged on the mouth of the outlet duct 15 that is formed in the female portion 3a of the mould 3.

A separator layer 32 permeable to the resin (a release ease layer) is arranged on the mouth of the outlet duct 15 that is formed between the cover portions 3b and 3c and a perforated metal plate 33 (a caul plate) and a bleeder layer 31 for the absorption of the excess resin are superimposed thereon.

Strips 34 of non-siliconized rubber (airpad rubber) are then arranged around the mouths of the outlet ducts 15. A perforated separator film 36, for example of FEP, for the through-flow of the gases which are released during curing is then fixed on the strips 34 by means of adhesive tape 37.

A layer of breather (airweave) fabric 38 is then arranged over the entire mould 3 and, finally, a bag film 39 is positioned thereon and is sealed peripherally onto the platform 2 by means of a peripheral sealing strip 39a. The bag film 39 is provided conventionally with vacuum valves (not shown) which are then connected to a vacuum system. The application of the vacuum helps to promote the flow of the resin on its path inside the mould towards the outlet duct.

The heating and the pressurization in the autoclave are programmed so as to bring about the fluidization of the resin in the reservoir 10 and then the transfer of the resin through the inlet duct 5 and hence its injection into the mould 3 to reach the seat in which the preform P is housed, and subsequent infusion of the resin into the preform P. The excess resin is discharged through the outlet ducts 15 and is absorbed by the layers 31 arranged at the outlets of those ducts. Naturally, the heating and pressurization are also programmed to bring about the polymerization of the resin and thus the solidification of the infused preform P to produce the structural element to be manufactured.

As can be seen, the arrangement of the reservoirs 10 in the mould 3, and hence close to the preform P to be infused, enables a process of infusion in a closed mould to be used even with highly viscous resins such as resins containing a toughening agent.

Moreover, the arrangement of the reservoirs 10 in accordance with the shape of the preform P enclosed in the mould 3 enables the resin to be distributed as uniformly as possible throughout the preform P.

The principle underlying the present invention has been applied by the inventors to the production of an aircraft window frame.

Figure 2:
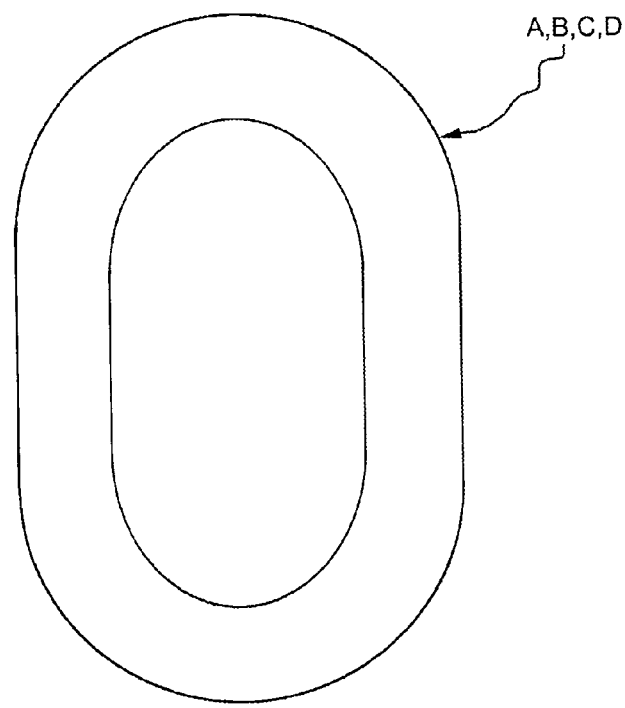
FIG. 2 is a simplified plan view of a preform for the manufacture of an aircraft window frame.

The frame is produced from four carbon fibre preforms A, B, C D having an elongate, annular shape in a plan view, as in the embodiment illustrated in FIG. 2.

These dry preforms are produced by means of a stitching process such as that described in European patent No. EP-A-1 584 462, by virtue of which carbon fiber tows are arranged in superimposed layers with fibres oriented in the desired directions, and are held together by a nylon stitching yarn.

Figure 3:
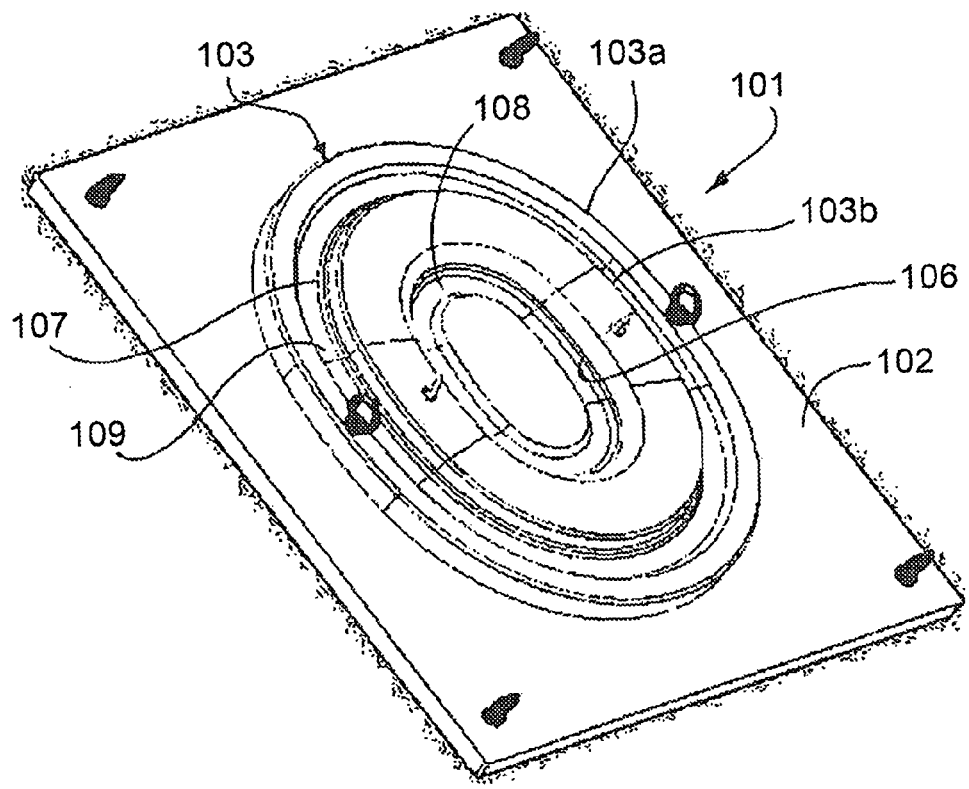
FIG. 3 is a simplified perspective view of a tool according to the invention, designed for the manufacture of an aircraft window frame, in a closed configuration.
Figure 4:
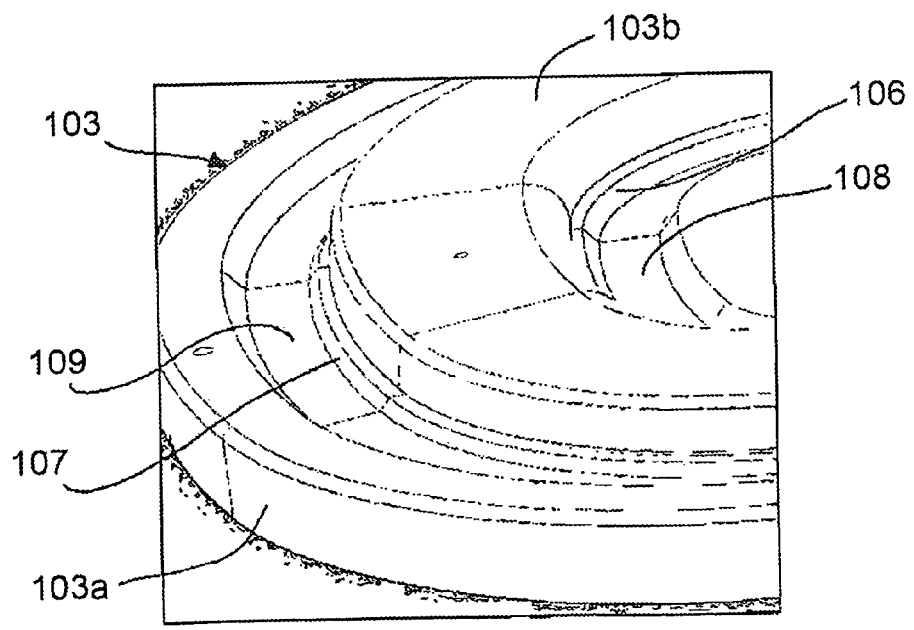
FIG. 4 is a perspective view showing a detail of the tool of FIG. 3, on an enlarged scale.

The dry preforms A, B, C, D are then positioned on a curing tool 101, shown in FIGS. 3 and 4.

The curing tool 101 is formed in accordance with the principle described above with reference to FIG. 1 but adapted for the specific geometry of the structural element to be produced. It therefore comprises a platform 102 and a mould 103 positioned on the platform 102. The mould 103 comprises two portions 103a and 103b. The portion 103a constitutes a female portion of the mould which is fixed to the platform 102 and can receive the preforms A, B, C, D, together with an internal shaping element M of expanded material, in accordance with the arrangement shown in FIG. 5. The portion 103b of the mould 103 constitutes a cover portion suitable for being positioned on the female portion 103a in a coordinated manner so as to enclose the preforms A, B, C, D assembled on the female portion 103a.

Figure 5:
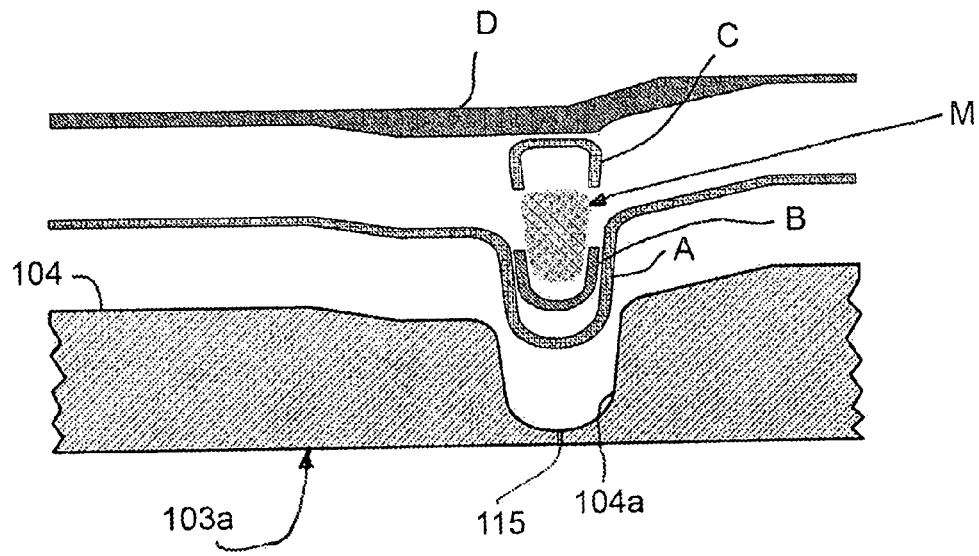
FIG. 5 is a simplified, sectioned and exploded view of a portion of the tool of FIG. 3 on which preforms for the manufacture of a window frame are arranged.
Figure 7:
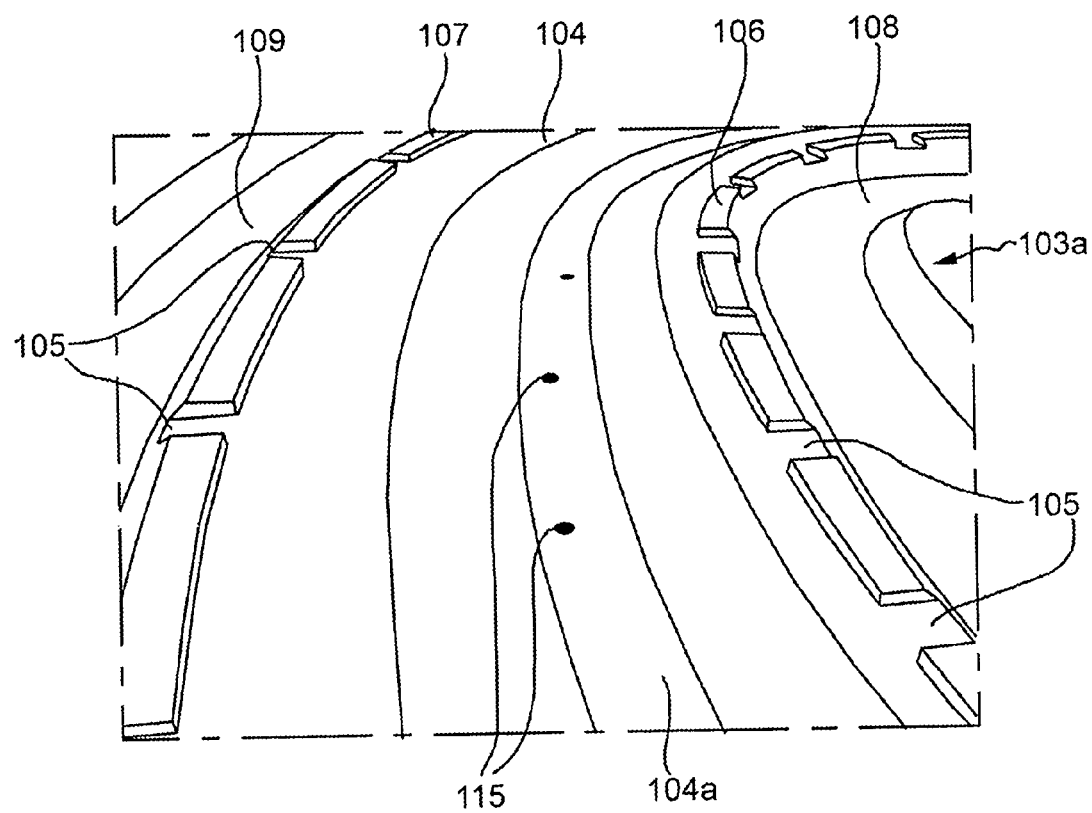
FIG. 7 is a perspective view showing a portion of the tool of FIG. 3 on an enlarged scale.

A recess 104 which is formed in the female portion 103a of the mould 103 and extends in a ring around that portion 103a is shown in FIGS. 5 and 7. A central groove 104a which is formed along the recess 104 and extends along it in a ring is positioned in a substantially intermediate transverse position relative to the inner and outer sides of the recess 104. The base surface of the recess 104 is inclined from the inner and outer sides of the recess 104 towards the central groove 104a, as can clearly be seen in FIG. 5. The recess 104 with the groove 104a serves for the assembly of the preforms A, B, C, D with the shaping element M. The preforms are arranged in succession, their shapes being adjusted to fit the underlying parts. The groove 104a and the shaping element M enable the "omega"-shaped geometry required for the window frame to be obtained. Metal locating corners (not shown) are provided for the positioning and fixing of the cover 103b on the female portion 103a of the mould 103.

Figure 6:
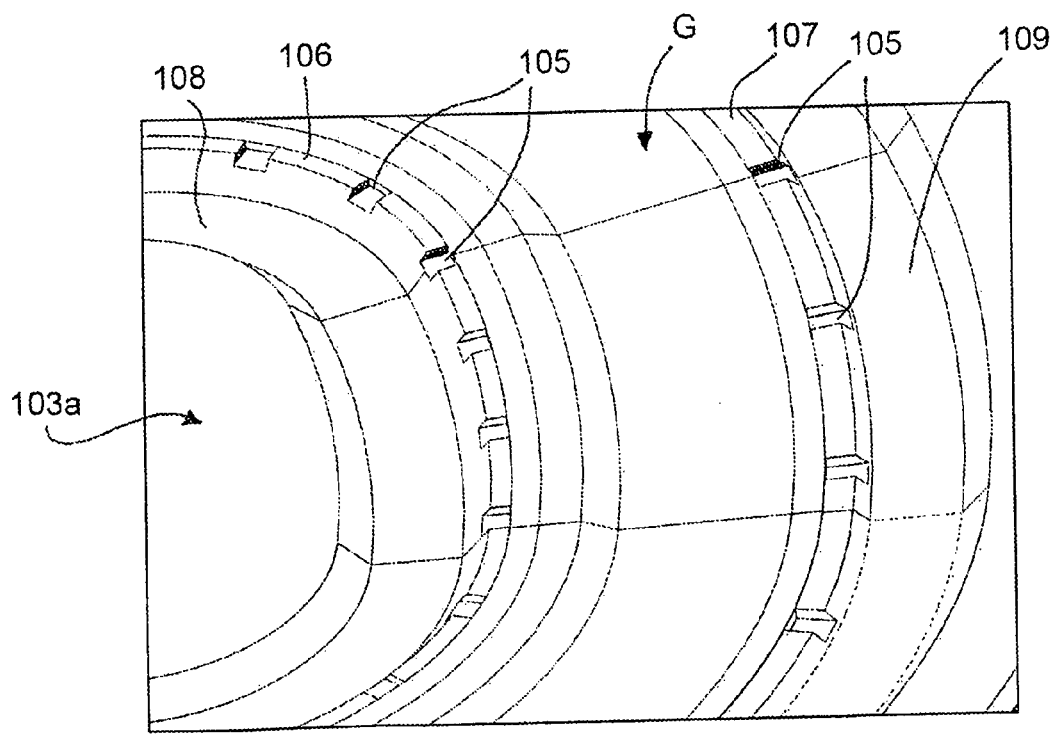
FIG. 6 is a perspective view showing, on an enlarged scale, a portion of the tool of FIG. 3 on which preforms for the manufacture of a window frame are assembled.

A plurality of inlet ducts 105 which are formed in the female portion 103a of the mould 103 can be seen in FIGS. 6 and 7. The inlet ducts 105 are formed by two rows of radial openings arranged along a pair of walls 106, 107 which delimit the recess 104 on the inner side and on the outer side, respectively. The two rows of inlet ducts 105 connect the recess 104, respectively, to an inner reservoir 108 and to an outer reservoir 109 which are suitable for containing the resin for the infusion of the preforms A, B, C, D. The reservoirs 108 and 109 are constructed as annular spaces or chambers formed in an exposed surface of the mould 103, in particular the upper surface of the female portion 103a of the mould 103, and are arranged concentrically relative to the recess 104. The inlet ducts 105 thus allow resin to be injected into the mould so that the resin can be infused into the preforms A, B, C, D. This is illustrated clearly in FIG. 6 which shows the assembly G formed by the preforms A, B, C, D arranged so as to fill the recess 104 (which is therefore hidden from view), on the two sides of which the inlet ducts 105 are arranged.

A plurality of outlet ducts 115, which are also formed in the female portion 103a of the mould, can be seen in FIGS. 5 and 7. The outlet ducts 115 are formed by a row of holes arranged along the base of the groove 104a. The outlet ducts 115 connect the recess 104 with the exterior of the mould 103. The outlet ducts 115 thus allow the excess resin to be discharged in the manner described below.

Once the preforms A, B, C, D have been assembled with the shaping element M on the female portion 103a of the mould 103, the tool 101 is closed by the positioning of the cover 103b which covers the recess 104, leaving the reservoirs 108, 109 exposed.

The resin, in film form, is placed in the reservoirs 108 and 109. Prior to the autoclave cycle, a vacuum bag is prepared in a manner similar to that described above. During the consolidation cycle in the autoclave, the combined effect of the pressure and of the temperature promotes the infusion of the preforms and the polymerization of the resin; in particular, during the first heating stage, the temperature promotes the melting of the resin that is present in the reservoirs 108 and 109 and the pressure promotes the flow of the resin into the mould 103; the path of the resin is thus constituted by the lateral inlet ducts 105 and by the outlet ducts 115 in the base of the groove 104a.

The polymerization of the resin and the consequent consolidation of the structural element (the window frame) takes place during the second stage of the curing cycle by virtue of the temperature and pressure of the autoclave.

In addition to the above-described advantages, the present invention, applied to the manufacture of an aircraft window frame, also has the following advantages.

In the first place, it permits the manufacture of structurally load-bearing carbon fiber windows that can be used for civilian aircraft in order to reduce the load on the fuselage structure (for example, the 787 currently has frames which are not load-bearing and which necessitate a considerable increase in the thicknesses of the fuselage panels).

All of this translates into a structural performance advantage which can be approximated to a 25% reduction in weight in comparison with a standard aluminium frame.

At the same time, there is also a reduction in costs which is due to two factors: on the one hand, the raw materials which, for an infusion process and for production volumes that are not excessively high, have a lower cost in comparison with the use of pre-impregnated material; on the other hand, the reduction in the weight of large numbers of windows permits a saving in aircraft fuel.

The invention claimed is:

1. A tool for the infusion of a resin into a preform made of fibre material, the tool comprising:
    a mould having a body, the mould configured to close, the mould comprising a female portion having a recess formed therein extending in a ring in the female portion suitable for receiving a preform having an annular shape, and a cover portion suitable for being positioned on the female portion in a coordinated manner so as to enclose the preform;
    at least one inlet duct in the body to allow resin to be injected into the mould so that the resin can be infused into the preform,
    at least one reservoir, which can contain the resin, formed in the body of the mould and connected to the at least one inlet duct, wherein the mould is configured to be inserted in an autoclave and the at least one reservoir is configured to permit the transfer of the resin from the at least one reservoir to the at least one inlet duct under the effect of the temperature and of the pressure that are produced in the autoclave, providing for injecting the resin into the mould;
    wherein the at least one reservoir comprises a pair of reservoirs formed in the female portion of the mould and arranged concentrically and on transversely opposite sides of the recess, the reservoirs being connected to the recess by respective rows of openings arranged on transversely opposite sides of the recess.

2. A tool according to claim 1, wherein the at least one reservoir is constructed as a space or chamber formed in an exposed surface of the mould.

3. A tool according to claim 1, wherein a central groove is formed along the recess, the central groove extending in a ring along the recess and positioned in a substantially intermediate position relative to transversely inner and outer sides of the recess.

4. A tool according to claim 3, wherein at least one outlet duct is formed in the body of the mould to enable the excess resin to be discharged from the mould.

5. A tool according to claim 4, wherein the at least one outlet duct is formed by a row of holes arranged along the base of the groove.

6. A method for the manufacture of a structural element made from composite material, comprising the following steps:
    preparing at least one preform made of fibre material;
    providing a mould having a body, the mould configured to close, the mould comprising a female portion having a recess formed therein extending in a ring in the female portion suitable for receiving a preform having an annular shape, and a cover portion suitable for being positioned on the female portion in a coordinated manner so as to enclose the preform, at least one inlet duct in the body to allow resin to be injected into the mould so that the resin can be infused into the preform, at least one reservoir, which can contain the resin, formed in the body of the mould and connected to the at least one inlet duct, wherein the mould is configured to be inserted in an autoclave and the at least one reservoir is configured to permit the transfer of the resin from the at least one reservoir to the at least one inlet duct under the effect of the temperature and of the pressure that are produced in the autoclave, providing for injecting the resin into the mould, wherein the at least one reservoir comprises a pair of reservoirs formed in the female portion of the mould and arranged concentrically and on transversely opposite sides of the recess, the reservoirs being connected to the recess by respective rows of openings arranged on transversely opposite sides of the recess;

enclosing the at least one preform in the mould; and subjecting the mould to heating and pressure and injecting resin through the at least one inlet duct to bring about the infusion of the resin into the at least one preform and subsequent polymerization of the resin;

wherein prior to the heating and pressure step, the resin is placed in a reservoir formed in the body of the mould and connected to the at least one inlet duct, wherein the reservoir is configured to permit the transfer of the resin from the reservoir to the at least one inlet duct under the effect of heat and of pressure.

\* \* \* \* \*